United States Patent
Myers

(10) Patent No.: US 8,594,586 B1
(45) Date of Patent: Nov. 26, 2013

(54) APPARATUS AND METHOD FOR CONDUCTING A PUSH-TO-TALK (PTT) CALL WITH A VOICE OVER IP (VOIP) COMMUNICATIONS DEVICE

(75) Inventor: Steven D. Myers, Lee's Summit, MO (US)

(73) Assignee: Nextel Communications Inc., Overland Park, KS (US)

( * ) Notice: Subject to any disclaimer, the term of this patent is extended or adjusted under 35 U.S.C. 154(b) by 700 days.

(21) Appl. No.: 12/366,897

(22) Filed: Feb. 6, 2009

(51) Int. Cl.
*H04B 1/38* (2006.01)

(52) U.S. Cl.
USPC ...................................... 455/90.2; 455/414.1

(58) Field of Classification Search
USPC ............... 455/90.2, 187.1, 414.1, 414.2, 416; 370/227, 260, 310, 328
See application file for complete search history.

(56) References Cited

U.S. PATENT DOCUMENTS

| 6,360,093 | B1 * | 3/2002 | Ross et al. | 455/414.1 |
| 7,394,761 | B2 * | 7/2008 | Foster et al. | 370/227 |
| 2008/0085688 | A1 * | 4/2008 | Skujins | 455/187.1 |

* cited by examiner

*Primary Examiner* — Lincoln Donovan
*Assistant Examiner* — Diana J Cheng

(57) ABSTRACT

An apparatus and method for conducting a Voice Over Internet Protocol (VOIP) push-to-talk (PTT) call is disclosed. In an embodiment of the apparatus of the present invention, the apparatus includes a communications device coupled to a service provider network. The communications device includes a processor which converts a PTT communication from a first format to a second format. In an embodiment of a method of the present invention, the method includes converting a PTT communication from a first format to a second format by the processor of the communications device coupled to the service provider network.

16 Claims, 2 Drawing Sheets

APPARATUS AND METHOD FOR CONDUCTING A PUSH-TO-TALK (PTT) CALL WITH A VOICE OVER IP (VOIP) COMMUNICATIONS DEVICE

FIELD OF THE INVENTION

The present invention relates generally to the field of telecommunications, and in particular, to an apparatus and a method for conducting a Push-To-Talk (PTT) call with a Voice Over IP (VOIP) communications device.

BACKGROUND OF THE INVENTION

Dispatch voice communications are becoming increasingly popular and additional service providers, utilizing a variety of different technologies, are now providing the capability for these types of calls to their subscribers. As is well known, dispatch communications are half-duplex communications where only one person at a time is able to speak. They are also known as "walkie-talkie", or push-to-talk, types of calls.

Whereas previously PTT calls were limited to only being provided by a single service provider, and thus by utilizing a single network technology, currently these types of calls are provided by additional service providers. Further, these types of calls are now being provided over various different network technologies by the different service providers, e.g., Voice Over Internet Protocol (VOIP), Code Division Multiple Access (CDMA), etc. Whereas there is interoperability for conducting PTT calls between the different service provider networks, and thus between the different technologies of the service provider networks, this interoperability generally requires complex technical solutions.

Therefore, there is a need to provide an improved apparatus and method for interoperating between different technologies for PTT calls.

SUMMARY OF THE INVENTION

In an embodiment of an apparatus of the present invention for conducting a Voice Over Internet Protocol (VOIP) push-to-talk (PTT) call, the apparatus includes a communications device coupled to a service provider network. The communications device includes a processor which converts a PTT communication from a first format to a second format.

In an embodiment of a method of the present invention for conducting a Voice Over Internet Protocol (VOIP) push-to-talk (PTT) call, the method includes converting a PTT communication from a first format to a second format by a processor of a communications device coupled to a service provider network.

DETAILED DESCRIPTION OF THE EXEMPLARY EMBODIMENTS

Figure 1:
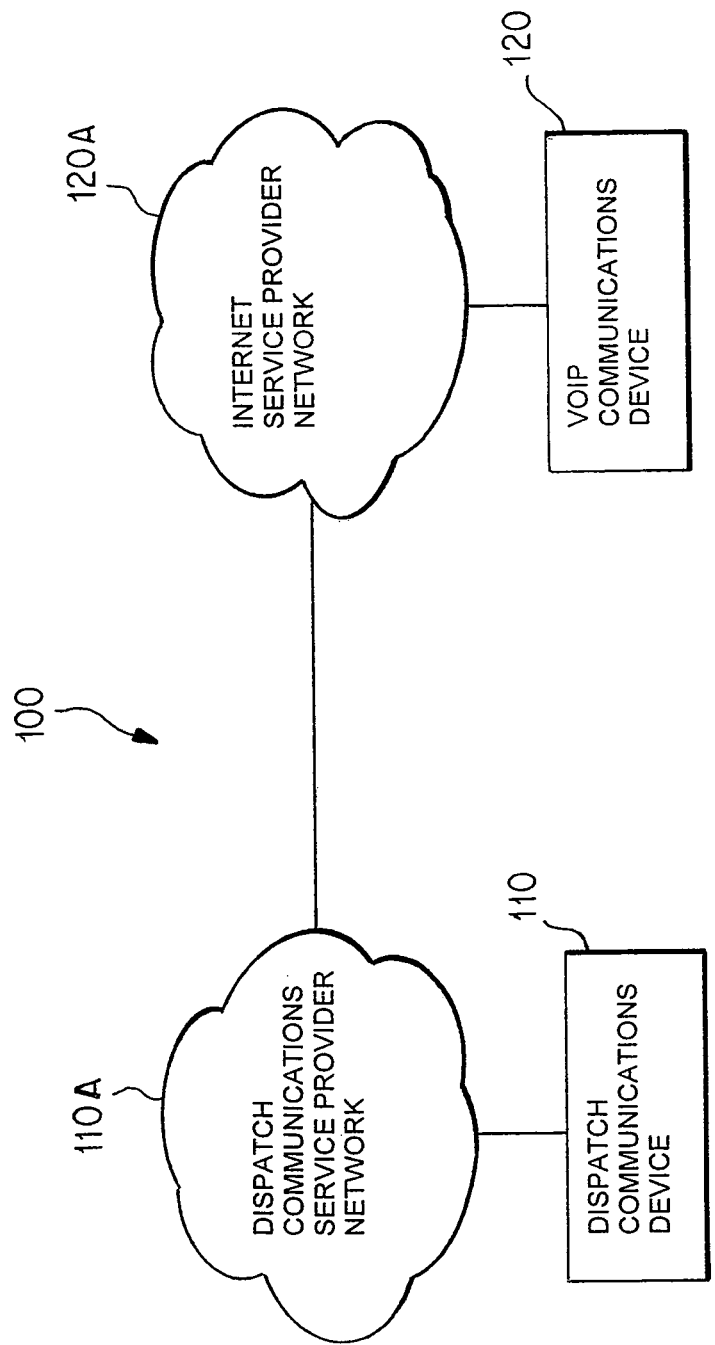
FIG. 1 illustrates a communications network architecture for conducting PTT calls between a dispatch communications device and a Voice Over IP communications device in accordance with the principles of the present invention.

FIG. 1 illustrates a communications network architecture 100 for participating in dispatch communications. As can be seen, and as discussed above, the architecture can include multiple technologies for conducting dispatch communications. As discussed earlier, a dispatch call is a half-duplex call where only one party at a time may speak. A party may speak when they have the "floor" in the call. As is known, when a party desires to speak during a dispatch call, or "walkie-talkie" or "push-to-talk" type call, the party presses a button on a communications device, e.g., a cell phone, that has a dispatch communications capability.

As can be seen in FIG. 1, a dispatch communications device 110 is coupled to a dispatch communications service provider network 110A. The dispatch communications device may be any of a variety of devices that provide for dispatch communications via a dispatch communications network. Thus, the dispatch communications device 110 may be a cell phone, a "walkie-talkie" radio, etc. All that is required is that the dispatch communications device provide for dispatch communications via a dispatch communications network. Similarly, the dispatch communications service provider network 110A is not limited to any particular service provider or technology. All that is required is that the dispatch communications service provider network provide for dispatch communications for subscribers of the service provider by utilizing dispatch communications devices. Thus, the dispatch communications service provider network may utilize the Integrated Digital Enhanced Network (iDEN) technology as utilized by Sprint Nextel or the Code Division Multiple Access (CDMA) technology as also utilized by Sprint Nextel. As such, a dispatch communication associated with dispatch communications device 110 and dispatch communications service provider network 110A is formatted in a dispatch communications format.

As will be discussed further below, even though both dispatch communications service provider network 110A and internet service provider network 120A can provide dispatch communications, a distinction is made between the two networks because dispatch communications service provider network 110A utilizes a dispatch communications format when providing dispatch communications services and internet service provider network 120A does not utilize a dispatch communications format. Rather, internet service provider network 120A utilizes a voice over internet protocol "VOIP" format for its communications, and if these communications are to be provided to a dispatch communications device, the dispatch communications must be re-formatted into a dispatch communications format such that dispatch communications can be conducted with a dispatch communications device. Thus, whereas internet service provider network 120A has the capability to provide dispatch services, the internet service provider network 120A does not utilize a dispatch communications format when providing such services.

In accordance with the principles of the present invention, dispatch communications device 110, which is coupled to dispatch communications service provider network 110A, desires to participate in a dispatch (PTT) communication with VOIP communications device 120 which is coupled to internet service provider network 120A. Since dispatch communications device 110 is provided with dispatch communications services by dispatch communications service provider network 110A, the format of the PTT communication from dispatch communications device 110 is in a dispatch communications format. Therefore, in order to communicate with VOIP communications device 120, the PTT communication must be converted from the dispatch format associated with dispatch communications device 110 and dispatch communications service provider network 110A to a VOIP format such that the PTT communication can be received by internet service provider network 120A and provided to VOIP communications device 120.

Figure 2:
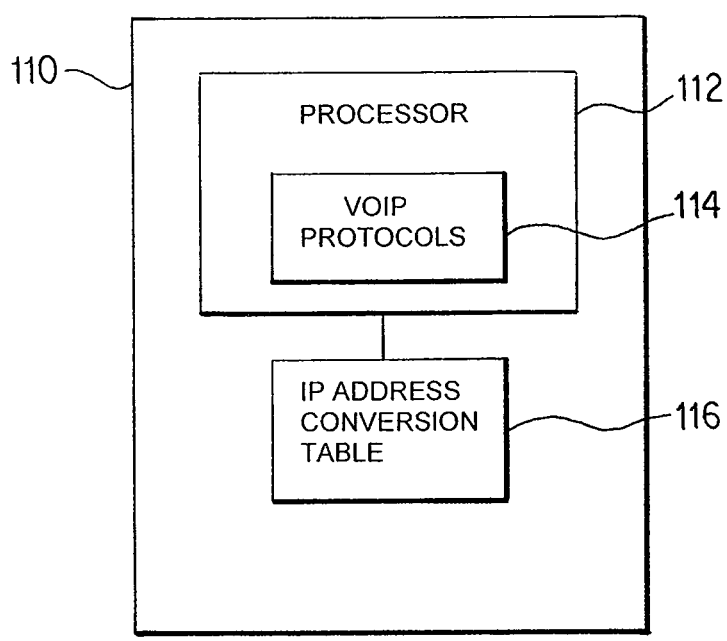
FIG. 2 further illustrates a communications device for interoperating between different technologies for PTT calls in accordance with the principles of the present invention.

In order to convert the format of the PTT communication from the dispatch communications format to the VOIP communications format, in accordance with the principles of the present invention, dispatch communications device 110, as can be seen in FIG. 2, includes a processor 112 that converts the PTT communication from the dispatch communications format to the VOIP communications format. In order to perform this conversion, the processor 112 utilizes standard VOIP encoding, encapsulating, and transmission protocols 114. Thus, the VOIP protocols 114 convert the dispatch communications format into a VOIP communications format such that the dispatch communication is transmitted to the internet service provider network 120A and VOIP communications device 120 in a VOIP format, which can be processed by this VOIP network and VOIP communications device. As can be understood, the VOIP communications device 120 utilizes the same standard VOIP encoding, encapsulating, and transmissions protocols as the processor 112 of the dispatch communications device 110. Thus, both endpoint client/devices implement compatible VOIP and IP protocol standards. As such, the dispatch communications device 110 can seamlessly communicate with the VOIP communications device 120 for dispatch communications.

As can also be seen in FIG. 2, dispatch communications device 110 also includes an IP address conversion table 116. The IP address conversion table 116 is coupled to processor 112 and allows processor 112 to correlate an identifier that is associated with the called party, i.e., VOIP communications device 120, to an IP address for the VOIP communications device 120. As can be understood, because dispatch communications device 110 communicates with other dispatch communications devices, these other dispatch communication devices are identified by identifiers that are associated with a dispatch communications format. For example, the identifier for the called party may be an iDEN PTN number. Therefore, for the dispatch communications device 110 to be able to communicate with a VOIP communications device 120, the dispatch communications device 110 may be required to translate an identifier for the VOIP communications device 120 to the IP address for the VOIP communications device 120. The IP address conversion table 116 provides the correlation between an identifier for the VOIP communications device 120 and its IP address. For example, if a user with dispatch communications device 110 wants to call John Doe who is using VOIP communications device 120, the user can merely select John Doe from an address list on the dispatch communications device and the processor 112 can access IP address conversion table 116 to correlate an IP address to the called party identifier, i.e., "John Doe". Thus, the user is not required to remember or provide IP addresses for called parties using VOIP communications devices, rather, the IP address conversion table can contain this information.

There can be many alternative embodiments for populating the IP address conversion table 116 and the present invention is not limited to any particular method. For example, the IP addresses can be downloaded from dispatch communications service provider network 110A or the user can locally input the IP address utilizing the communications device's keypad. The dispatch communications service provider network 110A can inquire of internet service provider network 120A for an IP address of a subscriber of the network based on an identifier, e.g., John Doe, associated with a called party. Dispatch communications service provider network 110A can then download this IP address to the IP address conversion table 116 of the dispatch communications device 110.

As with the dispatch communications device 110, the VOIP communications device 120 is not limited to any particular type of VOIP device. For example, the VOIP device can be a personal computer. The VOIP communications device 120 would be required to include an ability to "turn the call around" with a push-button or iconic software button which signals the desire for the user of the VOIP communications device 120 to talk, i.e., "take the floor", in the dispatch communication. This push-button or iconic software button is similar in functionality to a "push-to-talk" button associated with dispatch communications device 110.

As can be understood, in the same manner that VOIP protocols 114 convert a dispatch format to a VOIP format such that a dispatch communication can be sent by dispatch communications device 110 and received by VOIP communications device 120 in the VOIP format, the VOIP protocols 114 also provide for the conversion required for converting the VOIP formatted dispatch communication from VOIP communications device 120 to dispatch communications device 110. In this direction of the communication flow, the processor 112 utilizes the VOIP protocols 114 to convert the VOIP formatted communication to a dispatch formatted communication such that the dispatch communications device 110 can process the communication for the user of the communications device. Similar to the address conversion table included in dispatch communications device 110, VOIP communications device 120 could also include an address conversion table which converts an identifier for a called party at dispatch communications device 110 to a dispatch formatted address associated with the dispatch communications device 110.

The present invention is not limited to only conducting dispatch communications between two parties. Multiple parties may participate in such dispatch communications, for example, in dispatch group calls.

Thus, in accordance with the principles of the present invention, using IP or VOIP based PTT the opportunity is presented to terminate a mobile originated PTT call to one or more IP based voice services, such as Time Warner Cable's digital phone service, Skype, Vonage, Gizmo Project, etc. The present invention also allows for VOIP based service originated PTT calls to a mobile device. The mobile PTT device has the ability to store the IP address or other Internet Routable identifying address of one or more VOIP capable termination points such as a PC running a Skype network client attached to the internet either wired or wirelessly. All endpoints utilize the same VOIP encoding algorithms and signaling protocols and/or translation gateways that allow the endpoints to communicate. The present invention reduces the complexity of the overall system required by the prior art by using standard VOIP encoding, encapsulating, and transmission protocols from endpoint to endpoint. Endpoint clients/devices simply need to implement compatible VOIP and IP protocol standards.

The disclosed embodiments are illustrative of the various ways in which the present invention may be practiced. Other embodiments can be implemented by those skilled in the art without departing from the spirit and scope of the present invention.

What is claimed is:

1. An apparatus for conducting a Voice Over Internet Protocol (VOIP) push-to-talk (PTT) call, comprising:
   a mobile dispatch communications device coupled to a first service provider network which uses a dispatch communications format, wherein the mobile dispatch communications device includes a processor which converts a PTT communication from a dispatch communications format to a VOIP format, translates a PTT identifier for a second communications device to a translated VOIP identifier of the second communications device, and transmits the communication in the VOIP format and the translated VOIP identifier to a second service provide network which uses the VOIP format and which is in communication with the first service provide network.

2. The apparatus of claim 1, wherein the dispatch communications format is an Integrated Digital Enhanced Network (iDEN) format.

3. The apparatus of claim 1, wherein the dispatch communications format is a Code Division Multiple Access (CDMA) format.

4. The apparatus of claim 1, wherein the processor utilizes standard VOIP encoding, encapsulating, and transmission protocols when converting the PTT communication from the dispatch communications format to the VOIP format.

5. The apparatus of claim 4, wherein the second communications device is coupled to the second service provider network, wherein the second communications device is a VOIP communications device which uses the VOIP format, wherein the second communications device conducts a VOIP PTT call with the mobile dispatch communications device, and wherein the second communications device includes the standard VOIP encoding, encapsulating, and transmission protocols.

6. The apparatus of claim 5, wherein the mobile dispatch communications device is a cell phone and the second communications device is a personal computer.

7. The apparatus of claim 1, wherein the mobile dispatch communications device further includes an Internet Protocol (IP) address conversion table to correlate the PTT identifier of the second communications device and the translated VOIP identifier of the second communications device.

8. The apparatus of claim 1, wherein the mobile dispatch communications device is a cell phone.

9. A method for conducting a Voice Over Internet Protocol (VOIP) push-to-talk (PTT) call, comprising the steps of:
converting a PTT communication from a dispatch communications format to a VOIP format by a processor of a mobile dispatch communications device coupled to a first service provider network which uses a dispatch communications format,
translating a PTT identifier for a second communications device to a translated VOIP identifier of the second communications device; and
transmitting the communication in the VOIP format and the translated VOIP identifier to a second service provide network which uses the VOIP format and which is in communication with the first service provide network.

10. The method of claim 9, wherein the dispatch communications format is an Integrated Digital Enhanced Network (iDEN) format.

11. The method of claim 9, wherein the dispatch communications format is a Code Division Multiple Access (CDMA) format.

12. The method of claim 9, wherein the processor utilizes standard VOIP encoding, encapsulating, and transmission protocols when converting the PTT communication from the dispatch communications format to the VOIP format.

13. The method of claim 12, wherein the a second communications device is coupled to the second service provider network, wherein the second communications device is a VOIP communications device which uses the VOIP format, wherein the second communications device conducts a VOIP PTT call with the mobile dispatch-communications device, and wherein the second communications device includes the standard VOIP encoding, encapsulating, and transmission protocols.

14. The method of claim 13, wherein the mobile dispatch communications device is a cell phone and the second communications device is a personal computer.

15. The method of claim 9, wherein the mobile dispatch communications device further comprises an Internet Protocol (IP) address conversion table to correlate the PTT identifier of the second communications device and the translated VOIP identifier of the second communications device by the processor of the mobile dispatch communications device.

16. The method of claim 9, wherein the mobile dispatch communications device is a cell phone.

\* \* \* \* \*